United States Patent [19]
Mueller et al.

[11] Patent Number: 5,307,344
[45] Date of Patent: Apr. 26, 1994

[54] METHOD FOR SETTING UP VIRTUAL CONNECTIONS IN PACKET SWITCHING NETWORKS

[75] Inventors: Bernd-Michael Mueller, Ottobrunn; Wolfgang Sitter, Munich, both of Fed. Rep. of Germany

[73] Assignee: Siemens Aktiengesellschaft, Munich, Fed. Rep. of Germany

[21] Appl. No.: 936,636

[22] Filed: Aug. 28, 1992

[30] Foreign Application Priority Data

Aug. 30, 1991 [DE] Fed. Rep. of Germany ....... 4128938

[51] Int. Cl.[5] ........................................... H04L 12/56
[52] U.S. Cl. ..................................... 370/60; 370/68.1
[58] Field of Search ................. 370/54, 58.1, 60, 60.1, 370/68.1, 94.1, 110.1, 119; 379/221

[56] References Cited

U.S. PATENT DOCUMENTS 5,014,266  5/1991  Bales et al. ........................ 370/60.1
5,140,588  8/1992  Danner ................................. 370/60
5,189,667  2/1993  Esaki et al. ........................... 370/60

Primary Examiner—Safourek: Benedict V.
Attorney, Agent, or Firm—Hill, Steadman & Simpson

[57] ABSTRACT

Method for setting up virtual connections in packet switching networks. In response to a call request with which the set up a virtual connection is requested and that is supplied to an originating switching center (for example, Verm1) of a first packet switching network (PVN1), the appertaining call request is modified when a suitable transmission path within the first packet switching network is not present. The modified call request is then transmitted via a network interface location (UE1) to a second packet switching network (PVN2) in order to set up an alternate route upon involvement of a further network interface location (UE2), to the destination switching equipment (Verm1) of the first packet switching network (PVN1) that participates in the virtual connection that was just requested.

9 Claims, 3 Drawing Sheets

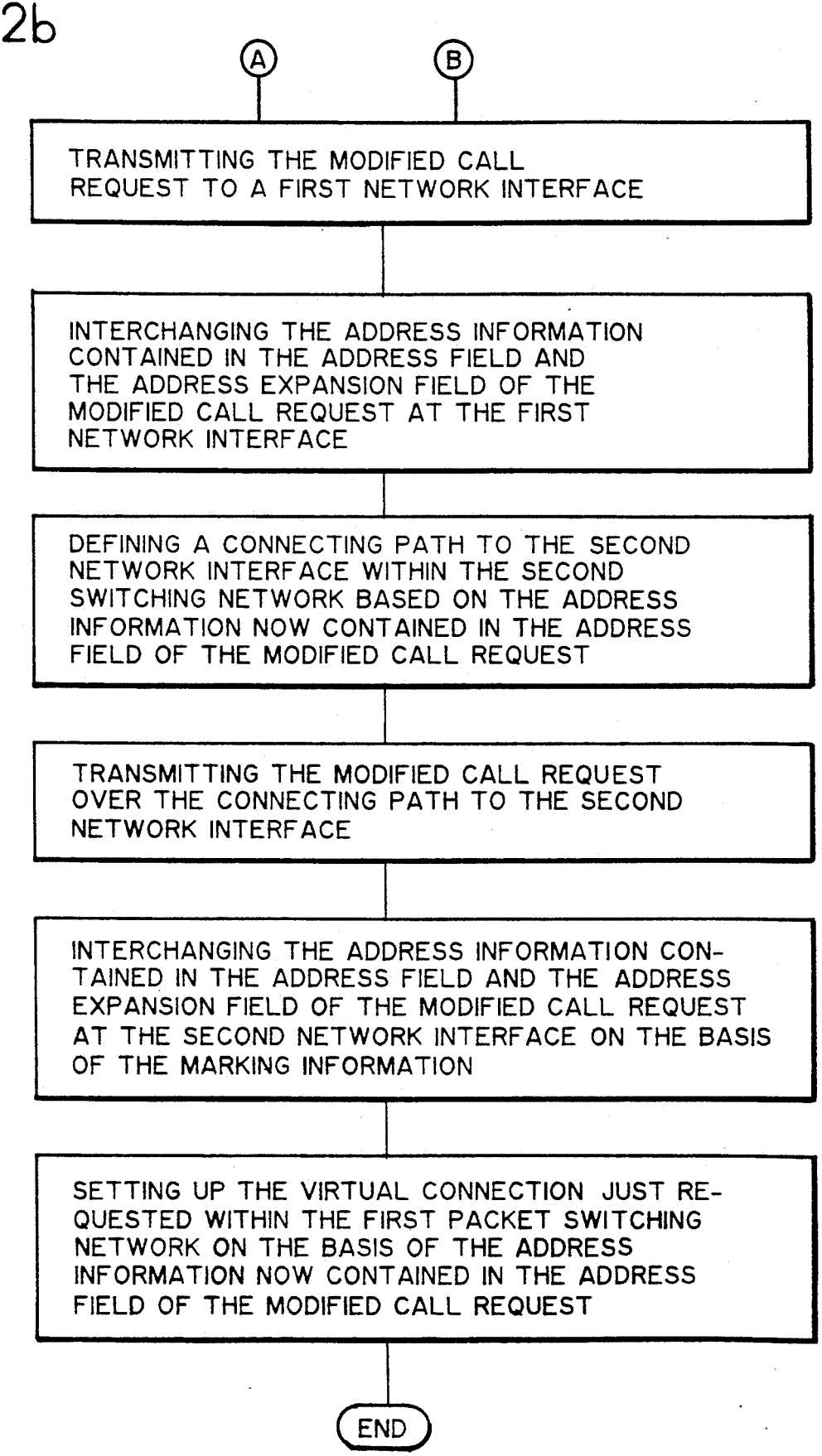

METHOD FOR SETTING UP VIRTUAL CONNECTIONS IN PACKET SWITCHING NETWORKS

BACKGROUND OF THE INVENTION

The present invention is directed to a method for setting up virtual connections between calling and called subscriber equipment connected to different switching equipment.

In telecommunication switching networks connected to one another by network interfaces, there is usually the possibility of, first, producing internal connections between subscriber equipment of one and the same telecommunications switching network and, second, of producing external connections between subscriber equipment of different telecommunications switching networks by using the network interfaces. The respective type of connection is defined by transmitting from the respective calling subscriber equipment appropriate signalization information, for example in the form of selection digits. In the case of packet switching networks, that are connected to one another by network interfaces, the request for an internal or external virtual connection can be provided from calling subscriber equipment in that an address information specifying a respective type of connection in an address field of a call request packet, serving the purpose of initiating a call set up, is transmitted to the switching equipment that is connected to the appertaining calling subscriber equipment.

SUMMARY OF THE INVENTION

It is an object of the present invention to provide, in a method for setting up virtual connections, alternatively setting up a connecting route upon involvement of a second packing switching network given the absence of a connecting route in the first packet switching network.

This object is achieved by a method of the present invention for setting up virtual connections between calling and called subscriber equipment connected to different switching equipment of a first packet switching network based on address information indicating the called subscriber equipment. The address information is transmitted in address fields of call requests with which virtual connections requested proceeding from calling subscriber equipment are indicated. At least a first network interface location from one of the switching equipment of the first packet switching network to a second packet switching network as well as at least one second network interface location from the second packet switching network to a switching equipment of the first packet switching network differing from the on switching equipment are provided. The method of the present invention has the following steps:

an address information respectively indicating the respective second network interface location is deposited in the switching equipment of the first packet switching network connected to the subscriber equipment;

upon appearance of a call request with which the set up of a virtual connection within the first packet switching network is requested by a calling subscriber equipment, a route search for a connecting path within the first packet switching network is first implemented in the switching equipment connected to the appertaining, calling subscriber equipment based on the address information contained in the address field of the appertaining call request;

when such a connecting path is not present, the appertaining call request for a call set up is transmitted via the second packet switching network to the respective, first network interface location in modified form, in that an address expansion field wherein the address information indicating the respective, second network interface location is provided in the modified call request in addition to the address field, and a marking information is set;

the address information contained in the address field and the address expansion field of the modified call request are interchanged with one another at this first network interface location;

subsequently, a connecting path to the respective, second network interface location is defined within the second packet switching network based on the address information now contained in the address field of the modified call request and indicating the respective, second network interface location and the modified call request is conducted thereto;

the address information contained in the appertaining address field and address expansion field in the modified call request are again interchanged with one another at the respective, second network interface location on the basis of the marking information set in the modified call request; and based on the address information now contained in the address field of the modified call request indicating the called subscriber equipment, the virtual connection just requested is set up within the first packet switching network to the called subscriber equipment coming into consideration.

An advantage of the present invention is that an alternate path upon involvement of the second packet switching network is defined as needed for a virtual connection to be set up between subscriber equipment of the first packet switching network, i.e. given the absence of a suitable connecting path within the first packet switching network without having the subscriber equipment participating in the appertaining virtual connection being involved in any way whatsoever in the call set up by the alternate path.

The following are advantageous developments of the present invention. A network interface location is provided between each of the switching equipment of the first packet switching network and the second packet switching network. Respective address information with respect to all network interface locations are deposited in the switching equipment of the first packet switching network connected to the subscriber equipment. Upon appearance of a call request, one of the network interface locations is selected by the switching equipment of the first packet switching network connected to the calling subscriber equipment when it is necessary to set up the connection upon involvement of the second packet switching network. The network interface location is selected based on the address information contained in the appertaining call request. The address information indicating this network interface location is transmitted in a modified call request allocated to the appertaining call request.

Performance feature information, contained in a call request with which performance features defined for the respective virtual connection are requested and that are to be transmitted to the switching equipment of the first packet switching network connected to the called subscriber equipment, is inserted into a user data field of the modified call request allocated to the appertaining call request.

The first packet switching network can be a private packet switching network whereas the second packet switching network can be a public packet switching network.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

FIGS. 2a and 2b are flowcharts depicting the method of the present invention.

DESCRIPTION OF THE PREFERRED EMBODIMENT

Figure 1:
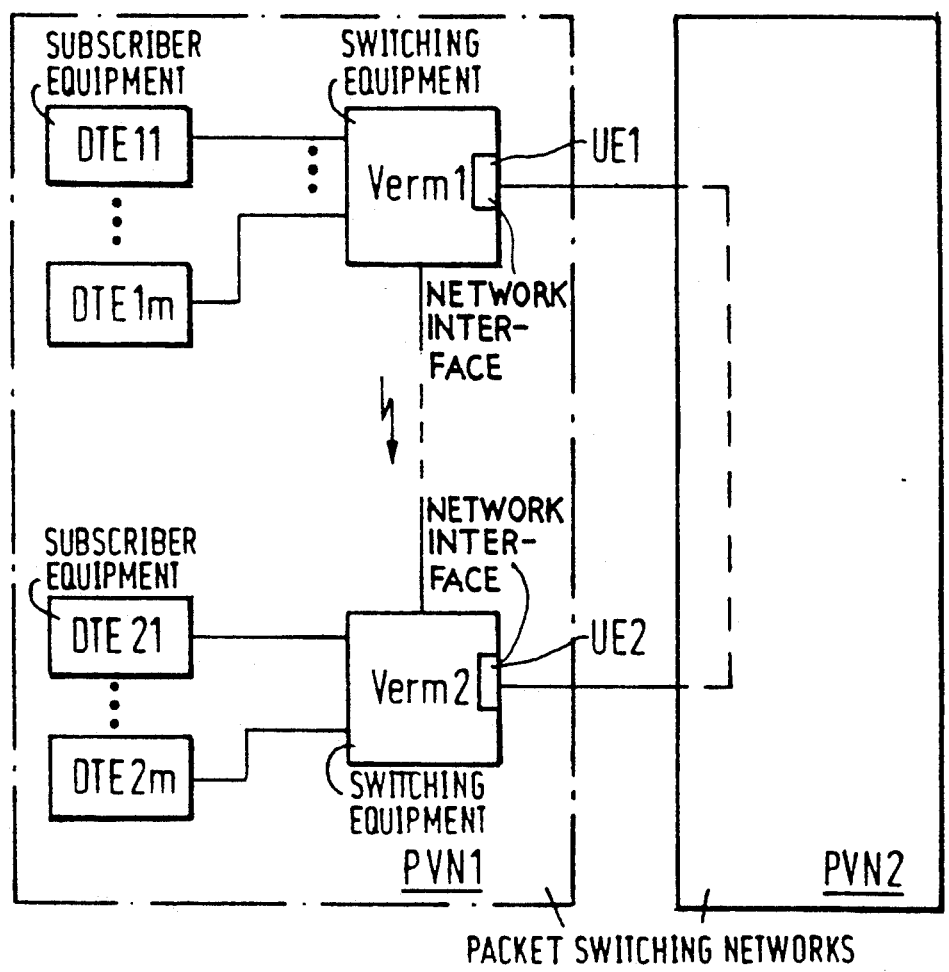
FIG. 1 shows a block circuit diagram of packet switching networks connected to one another by network interface equipment wherein the present invention is employed.

Two separate packet switching networks PVN1 and PVN2 are shown in the FIG. 1. They are connected to one another by network interface locations UE1 and UE2. Let the packet switching network PVN1 thereby be, for example, a private packet switching network and let the packet switching network PVN2, by contrast, be a public packet switching network. Let at least one switching equipment Verm1 as well as switching equipment Verm2 thereby belong to the packet switching network PVN1. A plurality of subscriber equipment is assumed to be respectively connected to these switching equipment. These subscriber equipment are referenced DTE11 through DTE1m and, respectively, DTE21 through DTE2m in accord with their affiliation to the two switching equipment. A respective transmission of signaling packets serving the purpose of setting up virtual connections and of data packets occurs between these subscriber equipment and the appertaining switching equipment according to CCITT Recommendation X.25 given existing virtual connections. According to this CCITT Recommendation, signaling packets and data packets are also exchanged between the two packet switching networks PVN1 and PVN2 by means of the two afore-mentioned network interface locations UE1 and UE2.

The two switching equipment Verm1 and Verm2, which can respectively carry out both originating as well as destination switching functions, are in communication with one another by one or more trunk lines, whereby these trunk lines can be conducted over tandem switching centers. The transmission of signaling packets and data packets thereby occurs according to CCITT Recommendation X.75.

Figure 2A:
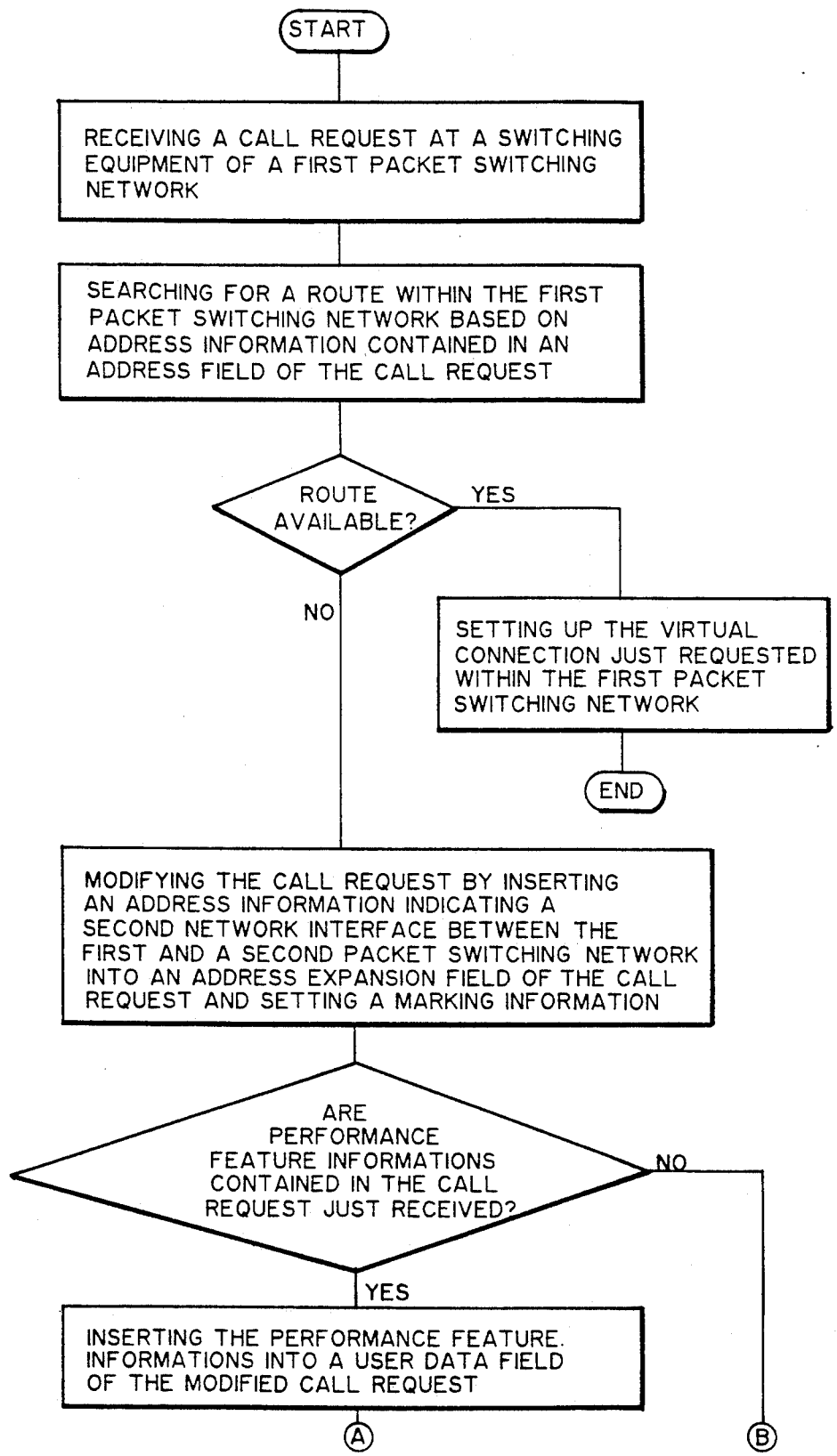

The fundamental structure of the packet switching network PVN1 as well as the coupling thereof to the packet switching network PVN2 having been set forth above, the method of the present invention shall now be discussed in greater detail. The method of the present invention is also described by the flowchart depicted in FIGS. 2a and 2b. To that end, let it be assumed as an example that a virtual connection is to be set up from the subscriber equipment DTE11 to the subscriber equipment DTE21. For this call set up, a call request is transmitted by the calling subscriber equipment DTE11 to the switching equipment Verm1 according to CCITT Recommendation X.25. Address information with which the subscriber equipment DTE21 is referenced as called subscriber equipment is thereby contained in an address field of this call request. Based on this address information, a route search for a suitable connecting path within the packet switching network PVN1 for the virtual connection that is to be set up is then conducted by the switching equipment Verm1. When such a connecting path is defined, then the rest of the call set up occurs by exchanging signaling packets between the switching equipment Verm1 and Verm2 and the subscriber equipment DTE11 and DTE21 participating in the virtual connection now to be set up. This occurs according to CCITT Recommendation X.25 or, respectively, X.75.

When, in the afore-mentioned path search, by contrast, the case occurs that no suitable connecting path within the packet switching network PVN1 can be defined to the called subscriber equipment DTE21 (for example, due to an interruption of the trunk line or trunk lines provided between the switching equipment Verm1 and Verm2), then, as shall be set forth below, an alternate path is selected upon involvement of the packet switching network PVN2. For the selection of such an alternate path, the call packet just received by the switching equipment Verm1 is modified such that an address expansion field is provided in addition to the aforementioned address field. The address information previously contained in the address field that indicates the called subscriber equipment DTE21 is entered into this address expansion field. By contrast, address information indicating the network interface location UE2 is transferred into the address field itself, this address information being deposited in the database of the switching equipment Verm1. In addition, marking information is entered within the modified call request.

The call request modified in this manner is then transmitted via the network interface location UE1 to the packet switching network PVN2. Based on the address information contained in the address field that indicates the network interface location UE2, a route search occurs therein for a suitable connecting path to this network interface location. After the definition of such a connecting path within the packet switching network PVN2, the modified call request is then transmitted by this connecting path and the network interface location UE2 to the switching equipment Verm2. On the basis of the marking information set in the modified call request just received, the address information contained in the address field and contained in the address expansion field are interchanged with one another in this switching equipment. The address information indicating the called subscriber equipment DTE21 is thus entered in the address field and the address information indicating the network interface location UE2 is entered in the address expansion field. Following thereupon and based on the address information that indicates the called subscriber equipment DTE21, a signaling packet generated according to CCITT Recommendation X.25 and indicating an incoming call is transmitted to this subscriber equipment. Upon receipt of this signaling packet, the called subscriber equipment DTE21 then first generates a call confirmation packet that is supplied to the calling subscriber equipment DTE11 via the previously defined alternate route. This call confirmation packet as well as the following signaling packets to be exchanged over the defined connecting path during the course of the call set up thereby again correspond to the signaling packets defined in CCITT Recommendation X.25. This concludes the example of the set up of a virtual connection between the subscriber equipment DTE11 and DTE21. Corresponding control procedures are also executed for all other virtual connections to be set up between subscriber equipment of the packet switching network PVN1 when an alternate route via the packet switching network PVN2 is to be defined for these virtual connections.

It can also occur in the above example that information about network-specific performance features requested by the calling subscriber equipment are contained in a service field provided according to CCITT Recommendation X.25 in a call request supplied to one of the switching equipment Verm1 and Verm2. These performance features are in fact defined within the packet switching network PVN1 but not within the packet switching equipment PVN2. The performance information is to be transmitted to the switching equipment Verm2 that serves as destination switching equipment in the example or, respectively, to the called subscriber equipment DTE21. In the definition of an alternate route upon involvement of the packet switching network PVN2, the performance information is entered into a user data field of the modified call request. This user data field is first transparently transmitted in the packet switching network PVN2, i.e. no evaluation of information contained therein occurs. An evaluation of the performance information only occurs in the switching equipment Verm2 of the packet switching network PVN1 on the basis of the marking information set in the modified call request.

It was assumed above that only two network interface locations UE1 and UE2 are provided between the two packet switching networks PVN1 and PVN2. However, a separate network interface location can be provided between each of switching equipment belonging to the packet switching network PVN1 and the packet switching network PVN2. In this case, the address information of the network interface locations of the other switching equipment are deposited in each of the switching equipment of the packet switching network PVN1. Given the appearance of a call request, one of the network interface locations is then selected by the switching equipment of the packet switching network PVN1 that is connected to the calling subscriber equipment given the necessity of a call set up involving the packing switching network PVN2. The network interface location is selected based on the address information contained in the call request just received and with which one of the subscriber equipment of the packet switching network PVN1 is identified as called subscriber equipment. The address information indicating this network interface location is then transmitted in the above-recited manner in a modified call request allocated to the call request that was just received. The selected network interface location is thereby a matter of the switching equipment connected to the called subscriber equipment, this thus functioning as destination switching equipment for the appertaining, called subscriber equipment.

Moreover, the above-described method for setting up virtual connections can also be fashioned to such effect that, when a connecting path within the packet switching network PVN1 becomes available again, a virtual connection initially conducted via an alternate route upon involvement of the packet switching network PVN2 is continued via this internal connecting path within the packet switching network PVN1. To this end, the fact that a virtual connection is conducted via an alternate route is separately retained in the switching equipment of the packet switching network PVN1 that functions as originating switching equipment for this virtual connection. Thus, this is thereby a matter of the switching equipment Verm1 in the above-explained example. When information is present in this switching equipment indicating that the previously down trunk line is again operational, then, for example, the above-described virtual connection between originating and destination switching equipment, i.e. between the switching equipment Verm1 and Verm2 in the present example, via the alternate route is thus cleared down. The virtual sub-connections existing between this switching equipment and the subscriber equipment participating in the respective virtual connection, the subscriber equipment DTE11 and DTE21 in this case, are not affected by this clear down. Following thereupon during the course of a renewed route search based on the address information still stored in the switching equipment Verm1 for the called subscriber equipment DTE21, a connecting path is then defined within the packet switching network PVN1 to the switching equipment connected to the called subscriber equipment, to the switching equipment Verm2 in this case, and a corresponding call request is transmitted thereover.

The appertaining call request thereby contains a service signal with which the switching equipment Verm2 is told that a virtual connection already conducted by an alternate route is merely to be re-established, i.e. that this call request is not to be transmitted to the called subscriber equipment. An exchange of signaling packets according to CCITT Recommendation X.75 occurs between the switching equipment Verm1 and Verm2 in response to receiving this call request in order to again completely produce the previous briefly interrupted virtual connection between the subscriber equipment DTE11 and DTE21.

In order to be able to implement the above-described set up of a virtual connection within the packet switching network PVN1 without loss of data packets and given the existence of an alternate route via the packet switching network PVN2, every data packet of the switching equipment Verm1 transmitted to the called subscriber equipment DTE21 is first separately acknowledged by the switching equipment Verm2 with an acknowledgement packet. This is achieved in that a defined control bit ("delivery confirmation") is set according to CCITT Recommendation X.25 by the switching equipment Verm1 in ever data packet to be transmitted.

With the re-establishment of the virtual connection previously conducted via the alternate route within the packet switching network PVN1, a resynchronization of the two switching equipment Verm1 and Verm2 with respect to the transmission and reception counters conducted in these for the appertaining virtual connection is then first implemented at the beginning of the data transmission phase. Given the transmission of data packets in an existing virtual connection, these transmission and reception counters are incremented with respect to their momentary counter reading based on the measure of the sequence number respectively contained therein. For example, this can occur in the switching equipment Verm2 with the output of an afore-mentioned acknowledgement packet but can occur in the switching equipment Verm1 with the reception of such an acknowledgement packet. In this way, the transmission and reception counters maintained in the two switching equipment normally have the same momentary counter readings due to the just-cited acknowledgement of each and every individual data packet.

However, due to the afore-mentioned re-establishment of the virtual connection initially conducted via a alternate route within the packet switching network PVN1 and due to the brief-duration clear down of the appertaining virtual connection connected therewith, it can occur that all of the data packets of the switching equipment Verm1 supplied to the switching equipment Verm2 have not yet been acknowledged, so that the transmission counter maintained in the switching equipment Verm1 has a momentary counter reading that deviates from the reception counter maintained in the switching equipment Verm2. In order to create a balance here, all data packets not yet acknowledged are initially retransmitted proceeding from the switching equipment Verm1.

These data packets are respectively acknowledged by the switching equipment Verm2 by an acknowledgement packet, as a result whereof the transmission counter maintained in the switching equipment Verm1 is then modified. If these data packets had already been previously supplied to the switching equipment Verm2 via the alternate route, they are acknowledged but then destroyed by the switching equipment Verm2 upon retention of the momentary counter reading of the reception counter.

After the just-cited balancing of the transmission and reception counters in the two switching equipment, data packets supplied to the switching equipment Verm1 proceeding from the subscriber equipment DTE11 are then transmitted to the switching equipment Verm2 in the usual way.

Over and above this, the switching equipment Verm1 can also transmit dummy packets between the two switching equipment Verm1 and Verm2 before the afore-mentioned as yet unacknowledged data packets, the appertaining sequence numbers of these dummy packets, proceeding from the sequence number "0", continuously incrementing up to a value of "n−1" when the momentary counter reading of the transmission counter maintained in the switching equipment Verm1 has a value "n" upon re-establishment of the virtual connection. These dummy packets are thereby destroyed in the switching equipment Verm2. It is assured in this way that all switching equipment participating in the re-established virtual connection are supplied with data packets whose appertaining sequence numbers continuously increase from an initial value of "0", as provided according to CCITT Recommendation X.25 or, respectively, X.75 for newly established virtual connections.

In conclusion, let it also be pointed out that the alternate set up of a virtual connection upon involvement of a public packet switching network PVN2 has in fact been set forth above with reference to the example of a virtual connection proceeding between the subscriber equipment DTE11 and DTE21 of a private packet switching network PVN1. However, the above-described method can always be generally used when a suitable connecting path for virtual connections is temporarily not present within a packet switching network, for example due to outage of trunk lines, and this packet switching network is in communication with another packet switching network via network interface locations.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for setting up virtual connections between calling subscriber equipment and called subscriber equipment connected to first and second switching equipment, respectively, of a first packet switching network based on address information indicating the called subscriber equipment, said address information being transmitted in an address field of a call request with which a requested virtual connection proceeding from the calling subscriber equipment is indicated, at least a first network interface location being provided from the first switching equipment of the first packet switching network to a second packet switching network and at least a second network interface location being provided from the second packet switching network to the second switching equipment of the first packet switching network, comprising the steps of:

deposition address information indicating the respective second network interface location in each of the switching equipment connected to the subscriber equipment of the first packet switching network;

implementing, upon appearance of a call request by which a set up of a virtual connection within the first packet switching network is requested by the calling subscriber equipment, a path search for a connecting path within the first packet switching network in the first switching equipment connected to the calling subscriber equipment based on the address information contained int eh address field of the call request;

modifying, when such a connection path is not present, the call request by inserting address information indicating the first network interface location in the address field and address information indicating the second network interface location in an address expansion field and by setting marking information, and transmitting the modified call request to the first network interface location for a call set up via the second packet switching network;

interchanging the address information contained in the address field and in the address expansion field of the modified call request with one another at the first network interface location;

defining a connecting path to the second network interface location within the second packet switching network based on the address information now contained in the address field of the modified call request that indicates the second network interface location and conducting the modified call request thereto;

again interchanging the address information contained in the address field and in address expansion field in the modified call request with one another at the second network interface location on the basis of the marking information set in the modified call request; and setting up, based on the address information now contained in the address field of the modified call request that indicates the called subscriber equipment, the virtual connection just requested within the first packet switching network to the called subscriber equipment.

2. The method according to claim 1, wherein:

a network interface location is provided between each of the switching equipment of the first packet switching network and the second packet switching network;

respective address information with respect to all network interface locations is deposited in each of the switching equipment of the first packet switching network; and upon appearance of a call request, one of the network interface locations is selected by the switching equipment of the first packet switching network connected to the calling subscriber equipment when it is necessary to set up a connection upon involvement of the second packet switching network, the selected network interface locations being selected based on the address information contained in the appertaining call request, and the address information indicating the selected network interface location being transmitted in a modified call request allocated to the appertaining call request.

3. The method according to claim 1, wherein performance feature information, contained in a call request with which performance features defined for a respective virtual connection are requested and that are transmitted to the switching equipment of the first packet switching network connected to the called subscriber equipment, is inserted into a user data field of the modified call request allocated to the call request.

4. The method according to claim 1, wherein the first packet switching network is a private packet switching network and the second packet switching network is a public packet switching network.

5. A method for setting up virtual connections between calling subscriber equipment and called subscriber equipment connected to first and second switching equipment, respectively, of a plurality of switching equipment of a first packet switching network based on address information indicating the called subscriber equipment, said address information being transmitted in an address field of a call request with which a requested virtual connection from the calling subscriber equipment is indicated, a plurality of network interface locations being provided such that a network interface location is respectively provided between each of the switching equipment of the first packet switching network and a second packet switching network, comprising the steps of:

depositing address information indicating all of the respective network interface locations in each of the switching equipment connected to subscriber equipment of the first packet switching network;

implementing upon appearance of a call request by which a set up of a virtual connection within the first packet switching network is requested by the calling subscriber equipment, a path search for a connecting path within the first packet switching network in the first switching equipment connected to the calling subscriber equipment based on the address information contained in the address field of the call request;

selecting, when such a connecting path is not present, one of the network interface locations by the first switching equipment of the first packet switching network connected to the calling subscriber equipment, the selected network interface location being selected based on the address information contained in the call request, and modifying, when such a connection path is not present, the call request by inserting address information indicating the first network interface location in the address field and address information indicating the second network interface location in an address expansion field and by setting marking information, and transmitting the modified call request to the first network interface location for a call set up via the second packet switching network;

interchanging the address information contained in the address field and in the address expansion field of the modified call request with one another at the selected network interface location;

defining a connecting path to the selected network interface location within the second packet switching network based on the address information now contained in the address field of the modified call request that indicates the selected network interface location and conducting the modified call request thereto;

again interchanging the address information contained in the address field and in address expansion field in the modified call request with one another at the selected network interface location on the basis of the marking information set in the modified call request; and setting up, based on the address information now contained in the address field of the modified call request that indicates the called subscriber equipment, the virtual connection just requested within the first packet switching network to the called subscriber equipment.

6. The method according to claim 5, wherein performance feature information, contained in a call request with which performance features defined for a respective virtual connection are requested and that are transmitted to the switching equipment of the first packet switching network connected to the called subscriber equipment, is inserted into a user data field of the modified call request allocated to the call request.

7. The method according to claim 5, wherein the first packet switching network is a private packet switching network and the second packet switching network is a public packet switching network.

8. A method for setting up virtual connections between calling subscriber equipment and called subscriber equipment connected to first and second switching equipment, respectively, of a plurality of switching equipment of a first packet switching network based on address information indicating the called subscriber equipment, said address information being transmitted in an address field of a call request with which a requested virtual connection from the calling subscriber equipment is indicated, a plurality of network interface locations being provided such that a network interface location is respectively provided between each of the switching equipment of the first packet switching network and a second packet switching network, comprising the steps of:

depositing address information indicating all of the respective network interface locations in each of the switching equipment connected to subscriber equipment of the first packet switching network;

implementing upon appearance of a call request by which a set up of a virtual connection within the first packet switching network is requested by the calling subscriber equipment, a path search for a connecting path within the first packet switching network in the first switching equipment connected to the calling subscriber equipment based on the address information contained in the address field of the call request;

selecting, when such a connecting path is not present, one of the network interface locations by the first switching equipment of the first packet switching network connected to the calling subscriber equipment, the selected network interface location being selected based on the address information contained in the call request, and modifying, when such a connection path is not present, the call request by inserting address information indicating the first network interface location in the address field and address information indicating the second network interface location in an address expansion field and by setting marking information, and transmitting the modified call request to the first network interface location for a call set up via the second packet switching network;

and inserting performance feature information, contained in the call request with which performance features defined for a respective virtual connection are requested and that are transmitted to the second switching equipment of the first packet switching network connected to the called subscriber equipment, into a user data field of the modified call request allocated to the call request;

interchanging the address information contained in the address field and in the address expansion field of the modified call request with one another at the selected network interface location;

defining a connecting path to the selected network interface location within the second packet switching network based on the address information now contained in the address field of the modified call request that indicates the selected network interface location and conducting the modified call request thereto;

again interchanging the address information contained in the address field and in address expansion field in the modified call request with one another at the selected network interface location on the basis of the marking information set in the modified call request; and setting up, based on the address information now contained in the address field of the modified call request that indicates the called subscriber equipment, the virtual connection just requested within the first packet switching network to the called subscriber equipment.

9. The method according to claim 8, wherein the first packet switching network is a private packet switching network and the second packet switching network is a public packet switching network.

* * * * *